F. E. ANDREANI.
BUMPER.
APPLICATION FILED JAN. 18, 1921.
1,382,879.
Patented June 28, 1921.
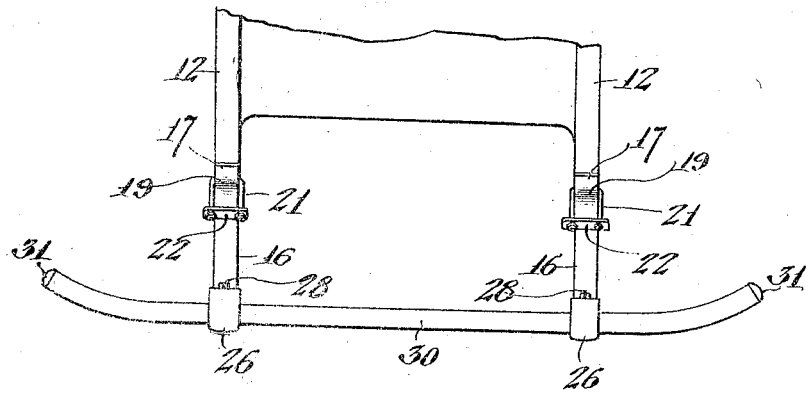
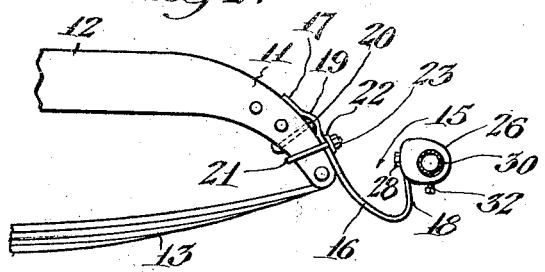
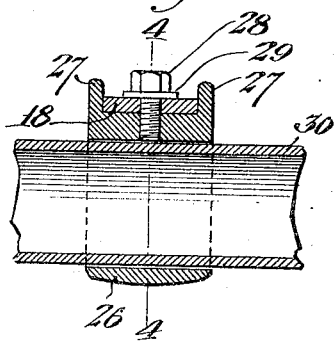
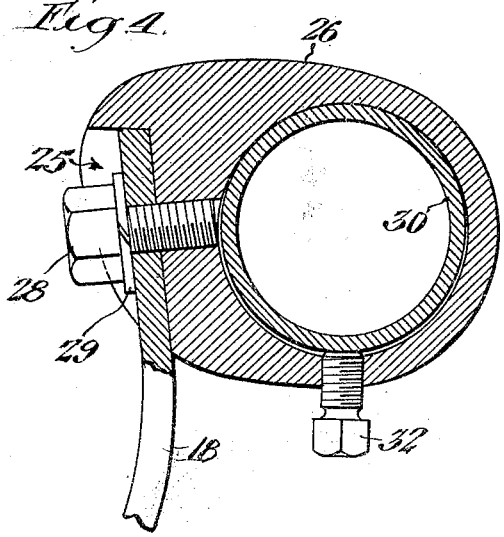
Inventor
Findley E. Andreani
by Graham Harris
Attorneys

UNITED STATES PATENT OFFICE.

FINDLEY E. ANDREANI, OF LOS ANGELES, CALIFORNIA.

BUMPER.

1,382,879. Specification of Letters Patent. Patented June 28, 1921.

Application filed January 18, 1921. Serial No. 438,072.

*To all whom it may concern:*

Be it known that I, FINDLEY E. ANDREANI, a citizen of the United States, residing at Los Angeles, county of Los Angeles, State of California, have invented a new and useful Bumper, of which the following is a specification.

My invention relates to the automobile art, being more particularly an attachment designed to be attached to the forward end of the frame of the automobile for supporting a bumper.

The principal object of my invention is to provide a strong and durable bumper attachment of neat appearance and simple construction.

Other objects and advantages will appear hereinafter from the following description and drawings.

Referring to the drawings which are for illustrative purposes only,

Figure 1 is a plan view of the forward end of an automobile frame showing a pair of bumper attachments supporting a bumpet.

Fig. 2 is a side elevation of the device shown in Fig. 1, the bumper being shown in section.

Fig. 3 is an enlarged sectional plan view of the outer end of one attachment, and Fig. 4 is an enlarged cross sectional view on line 4—4, Fig. 3.

11 designates the forward ends of the side members 12 of an automobile chassis or frame, such ends being usually curved downwardly and supporting the forward ends of the front springs 13.

A bumper attachment generally indicated at 15 is attached to each side member of the chassis and consists of a U-shaped flat spring member 16 having a long end 17 and a short end 18. The long end 17 lies upon the upper face of the frame and is provided with a bump 19 which fits over the head 20 of a rivet commonly forming a part of the chassis construction. The spring 16 is securely fastened to the member 12 by means of an U-bolt 21 which passes around the member 12, the ends of the U-bolt extending through a plate 22 to receive nuts 23. When the U-bolt 21 is firmly secured to the member 12, as above described, it will readily appear that the spring is prevented from creeping on the frame due to the engagement of the bump 19 with the rivet head.

The short end 18 of the spring 16 extends substantially vertically into a recess 25 formed in an eye 26, the end of the spring engaging the end wall of the recess and such recess having side walls 27 which engage the sides of the spring to provide a firm engagement between the spring and eye.

The collar 26 is secured on the end of the spring by means of a bolt 28, a spring washer 29 being interposed between the head of the bolt and the spring, as clearly shown in Figs. 3 and 4.

The bumper in the form shown consists of a pipe section 30 which extends through the eyes 26, the ends of the pipe being bent slightly rearwardly and provided with knobs or heads 31 for closing the ends of the pipe and enhancing the appearance of the bumper. The bumper is secured in the eyes 26 by means of a bolt or screw 32 threaded into the eye, the inner end of the screw engaging the bumper as shown in Fig. 4.

While I have shown and described the bumper as particularly adapted for the front end of the frame, it is to be understood that the bumper may be mounted on the rear end of the frame without departing from the spirit of my invention.

I claim as my invention:

1. A bumper attachment for automobile frames comprising a U-shaped flat spring member having a long end extending upwardly and rearwardly, a bump formed in the long end of the spring, an eye having a recess formed therein arranged to receive the other end of the spring, the side walls of such recess engaging the sides of the spring, a bolt securing said spring to the eye, a bumper extending through said eye and a screw in the eye engaging the bumper at its inner end.

2. A bumper attachment for automobile frames comprising a flat V-shaped spring member having a long end disposed on the upper face of the frame, a bump formed in such end arranged to engage a projection on the frame, a plate extending over such end at one side of said bump, a U-bolt passing around the frame engaging such plate, an eye having a recess to receive the other end of the spring, means for securing said eye to the spring, a hollow bumper extending through the eye, means for securing said bumper in the eye, and means for closing the ends of the bumper.

In testimony whereof, I have hereunto set my hand at Los Angeles, California, this 12th day of January, 1921.

FINDLEY E. ANDREANI.